US011584589B2

(12) United States Patent
Zheng

(10) Patent No.: US 11,584,589 B2
(45) Date of Patent: Feb. 21, 2023

(54) WAREHOUSING MANAGEMENT SYSTEM AND METHOD

(71) Applicant: BEIJING GEEKPLUS TECHNOLOGY CO., LTD., Beijing (CN)

(72) Inventor: Yong Zheng, Beijing (CN)

(73) Assignee: BEIJING GEEKPLUS TECHNOLOGY CO. LTD, Beijing (CN)

( * ) Notice: Subject to any disclaimer, the term of this patent is extended or adjusted under 35 U.S.C. 154(b) by 176 days.

(21) Appl. No.: 16/626,118

(22) PCT Filed: Apr. 8, 2019

(86) PCT No.: PCT/CN2019/081690
§ 371 (c)(1),
(2) Date: Dec. 23, 2019

(87) PCT Pub. No.: WO2020/062827
PCT Pub. Date: Apr. 2, 2020

(65) Prior Publication Data
US 2021/0354921 A1    Nov. 18, 2021

(30) Foreign Application Priority Data

Sep. 26, 2018  (CN) .......................... 201811124001.1

(51) Int. Cl.
*G06F 7/00* (2006.01)
*B65G 1/137* (2006.01)
*G06Q 10/087* (2023.01)

(52) U.S. Cl.
CPC ......... *B65G 1/1373* (2013.01); *G06Q 10/087* (2013.01)

(58) Field of Classification Search
CPC .. B65G 1/1373; B65G 1/1378; B65G 1/0414; B65G 1/1376; G06Q 10/087
(Continued)

(56) References Cited

U.S. PATENT DOCUMENTS 7,686,171 B1    3/2010  Shakes et al.
9,111,251 B1 *  8/2015  Brazeau ............... B65G 1/1373
(Continued)

FOREIGN PATENT DOCUMENTS

CN    104036375 A    9/2014
CN    105225090 A    1/2016
(Continued)

OTHER PUBLICATIONS

First Office Action with English translation received from corresponding Chinese Application No. 201811124001.1 dated Jul. 30, 2019.
(Continued)

*Primary Examiner* — Yolanda R Cumbess
(74) *Attorney, Agent, or Firm* — Innovation Capital Law Group, LLP; Vic Lin

(57) ABSTRACT

Provided are a warehousing management system and method. The system includes: a control server, an inventory container, an access device, a temporary container, a workstation and a carrying device. The control server is configured to, in response to a current task, determine a first target inventory container in which a target storage container hit by the current task is located, a first target access device, a target temporary container, a target workstation, and a first target carrying device, and control the first target access device to take out the target storage container from the first target inventory container, carry and store the target storage container to the target temporary container; and control the
(Continued)

first target carrying device to move the target temporary container to the target workstation for operation.

18 Claims, 7 Drawing Sheets

(58) Field of Classification Search
    USPC .......................................... 700/213–216, 228
    See application file for complete search history.

(56) References Cited

U.S. PATENT DOCUMENTS

| | | | |
|---|---|---|---|
| 10,029,851 B1* | 7/2018 | Durham | B65G 1/1373 |
| 2016/0355337 A1 | 12/2016 | Lert et al. | |
| 2017/0336780 A1* | 11/2017 | Wise | G06Q 10/087 |
| 2018/0127212 A1* | 5/2018 | Jarvis | B60P 1/02 |
| 2018/0158016 A1* | 6/2018 | Pandya | G05B 19/41895 |
| 2018/0194556 A1 | 7/2018 | Lert, Jr. et al. | |

FOREIGN PATENT DOCUMENTS

| | | |
|---|---|---|
| CN | 106477227 A | 3/2017 |
| CN | 106697700 A | 5/2017 |
| CN | 106843238 A | 6/2017 |
| CN | 107103445 A | 8/2017 |
| CN | 107378948 A | 11/2017 |
| CN | 107516142 A | 12/2017 |
| CN | 206877144 U | 1/2018 |
| CN | 108016800 A | 5/2018 |
| CN | 108423355 A | 8/2018 |
| CN | 109377125 A | 2/2019 |
| JP | 2018002326 A | 1/2018 |
| JP | 2018135170 A | 8/2018 |
| KR | 20180081113 A | 7/2018 |
| KR | 1020180081113 A | 7/2018 |
| WO | 2018129362 A1 | 7/2018 |
| WO | 2018129362 A1 | 12/2018 |

OTHER PUBLICATIONS

International Search Report received to corresponding International Application No. PCT/CN2019/081690 dated Jul. 24, 2019.
Examination report issued for Australian Patent Application No. 2019348580, dated Jun. 11, 2021.
Office Action issued for Korean Patent Application No. 10-2020-7013296, dated Dec. 29, 2021.
Examination Report dated Jun. 9, 2022 from Australia Application No. 2019348580.
Japan Office Action dated Oct. 13, 2020 from Japan Application No. 2019-570105.

* cited by examiner

WAREHOUSING MANAGEMENT SYSTEM AND METHOD

CROSS REFERENCE TO RELATED APPLICATIONS

This application is a United States National Stage Application of co-pending International Patent Application Number PCT/CN2019/081690, filed on Apr. 8, 2019 which claims priority to Chinese patent application No. 201811124001.1 filed on Sep. 26, 2018, the contents of which are incorporated herein by reference in their entirety.

TECHNICAL FIELD

The present disclosure relates to the field of warehousing technologies and, for example, to a warehousing management system and method.

BACKGROUND

With the economy blooming, the warehousing technology has been widely applied in life. It is especially important for the development of this industry to improve carrying efficiency, reduce energy consumption and carry cost.

In the related art, in a traditional scenario of a "goods-to-person" picking system, the robot is able to carry a rack containing items in the order to the corresponding picking place according to the order and the inventory information, and then an operator or an automatic device such as a robot arm at the picking place picks the items in the order from the rack and puts them in a specified container. After the picking task is completed, the robot returns the rack to the specified location.

Compared with manual picking, the traditional "goods-to-person" picking system has been improved to a certain degree in picking efficiency and picking accuracy. However, since the entire rack needs to be carried to the corresponding picking place when picking the items in the order, unneeded goods on the rack are moved to the corresponding picking place at the same time, thereby reducing the picking efficiency, increasing the energy consumption and the implementation cost of picking. Of course, operation scenarios include, but are not limited to loading, picking or stocking similar to the above picking scenario also have the same problem with the above picking scenario.

SUMMARY

The present disclosure provides a warehousing management system and method, so as to implement improving efficiency, reduce energy consumption and implementation cost.

The present disclosure provides a warehousing management system. The system includes a control server, an inventory container, an access device, a temporary container, a workstation and a carrying device; the access device and the carrying device respectively communicate with the control server, the inventory container contains a storage container, the inventory container and the temporary container are located in an inventory area; the control server is configured to, in response to a current task, determine a first target inventory container in which a target storage container hit by the current task is located, a first target access device configured to take out the target storage container from the first target inventory container, a target temporary container configured to temporarily hold the target storage container and a target workstation configured to operate the target storage container, and send a first access instruction to the first target access device; and in a case where the target temporary container satisfies a preset condition, determine a first target carrying device configured to carry the target temporary container to the target workstation, and send a first carrying instruction to the first target carrying device; the first target access device is configured to, in response to the first access instruction, take out the target storage container from the first target inventory container, carry and store the target storage container to the target temporary container; and the first target carrying device is configured to carry the target temporary container to the target workstation for operation in response to the first carrying instruction.

The present disclosure further provides a warehousing management method, including: determining, by the control server, according to a current task, a first target inventory container in which a target storage container hit by the current task is located, a first target access device configured to take out the target storage container from the first target inventory container, a target temporary container configured to temporarily hold the target storage container and a target workstation configured to operate the target storage container, and sending a first access instruction to the first target access device; and in a case where the target temporary container satisfies a preset condition, determine a first target carrying device configured to carry the target temporary container to the target workstation, and sending a first carrying instruction to the first target carrying device; taking out, by the first target access device, according to the first access instruction, the target storage container from the first target inventory container, carrying and storing the target storage container to the target temporary container; and carrying, by the first target carrying device, the target temporary container to the target workstation for operation according to the first carrying instruction.

The present disclosure further provides a warehousing management method, including: determining, by the control server, according to a current task, a first target inventory container in which a target storage container hit by the current task is located, a first target access device configured to take out the target storage container from the first target inventory container, a target temporary container configured to temporarily hold the target storage container and a target workstation configured to operate the target storage container, and sending a first access instruction to the first target access device; where the first access instruction is used for instructing the first target access device to take out the target storage container from the first target inventory container, and carry and store the target storage container to the target temporary container; in a case where the target temporary container satisfies a preset condition, determining, by the control server, a first target carrying device configured to carry the target temporary container to the target workstation, and sending a first carrying instruction to the first target carrying device; where the first carrying instruction is used for instructing the first target carrying device to carry the target temporary container to the target workstation for operation.

The present disclosure further provides a control server, including: at least one processor; and a memory configured to store at least one program. When executed by the at least one processor, the at least one program causes the at least one processor to implement the warehousing management methods described above.

According to the solution of the present disclosure, under the control of the control server, taking the temporary storage container as a transfer, the target storage container hit by the current task is carried by the target temporary container. This solves the problem that the entire inventory container needs to be carried to the corresponding workstation when the goods hit by the current task needs to be carried each time, thereby causing some unneeded goods to be carried to the corresponding workstation at the same time, thus increasing efficiency, reducing energy consumption and implementation cost.

DETAILED DESCRIPTION

Figure 1:
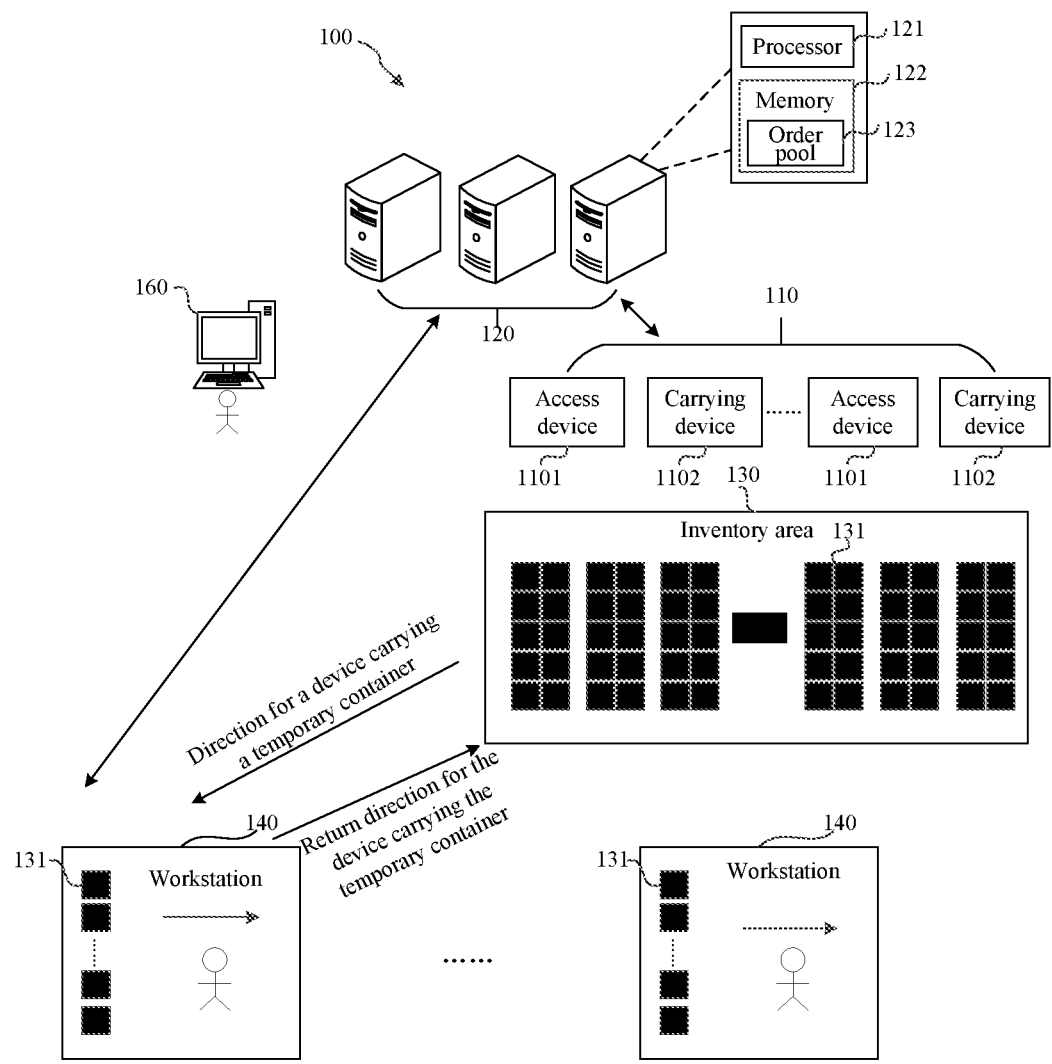
FIG. 1 is a structure diagram of a warehousing management system provided by an embodiment.

The present disclosure will be described below in conjunction with the drawings and embodiments. It should be understood that, the specific embodiments set forth below are merely intended to illustrate and not to limit the present disclosure. In addition, for ease of description, only part, not all, of structures related to the present disclosure are illustrated in the drawings.

FIG. 1 is a structure diagram of a warehousing management system provided by an embodiment. Referring to the structure diagram of the warehousing management system shown in FIG. 1, the system 100 includes: an access device 1101, a carrying device 1102, a control system 120, an inventory area 130 and a workstation 140. The inventory area 130 is provided with multiple inventory containers 131. Various items are placed in the inventory containers, such as items placed on a rack in a supermarket. The multiple inventory containers 131 may be arranged into an inventory container group, and multiple inventory container groups are arranged in an array. In addition, the inventory area 130 is further provided with a temporary container matching at least one inventory container 131 (not shown in FIG. 1). Usually, multiple workstations 140 are disposed on one side of the inventory area 130. In a picking scenario, the workstation 140 may also be called as a picking station.

The control system 120 performs wireless communication with the access device 1101 and the carrying device 1102 respectively. An operator may operate the control system 120 through an operation platform 160. The access device 1101 and the carrying device 1102 perform their corresponding operations under the control of the control system 120. For example, the control system 120 plans movement paths for the access device 1101 and the carrying device 1102 according to the task, and the access device 1101 and the carrying device 1102 move within an empty space (a part of a passageway of the access device 1101 and the carrying device 1102) in the inventory container array according to their movement paths. To facilitate planning the movement paths for the access device 1101 and the carrying device 1102, a working area of the access device 1101 and the carrying device 1102 (such working area at least includes an area in which the inventory area 130 and the workstation 140 are located) is divided into multiple subareas (i.e., cells), the access device 1101 and the carrying device 1102 move along the subareas one by one to form the movement path.

Figure 2:
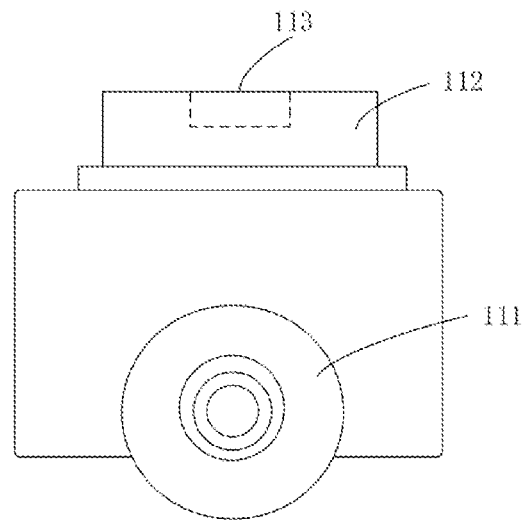
FIG. 2 is a structure diagram of a robot provided by an embodiment.

The access device 1101 may be a robot configured to take out the storage container from the inventory container and the temporary container, and the carrying device 1102 may be a carrying robot configured to carry the temporary container. In one example, if the carrying device 1102 is a robot, referring to FIG. 2, the robot may include a drive mechanism 111. Through the drive mechanism 111, the robot is able to move in the working area. The robot may further be configured to include a lifting mechanism 112 configured to carry the temporary container. The robot may move to underneath of the temporary container, and the robot may lift the temporary container by the lifting mechanism 112 and carry the temporary container to the workstation 140. When the lifting mechanism 112 is raised, the entire temporary container is lifted from the ground so that the robot carries the temporary container; and when the lifting mechanism 112 is lowered, the temporary container is placed on the ground. A target identification component 113 on the robot is able to effectively identify the temporary container in a case in which the robot lifts the temporary container.

In addition, if the robot is based on visual navigation, the robot may further include a navigation identification component (not shown in FIG. 2) for identifying navigation marks (such as, a two-dimensional code) laying on the ground. In an embodiment, the robot may further include a control module (not shown in FIG. 2) that controls the entire robot to implement functions such as movement and navigation. In one example, the robot at least includes a camera directed upward and a camera directed downward, and the robot is able to move forward according to a two-dimensional code (which may also be another ground sign) captured by the downward camera, and is able to move under the temporary container prompted by the control system 120 according to a route determined by the control system 120.

Figure 3:
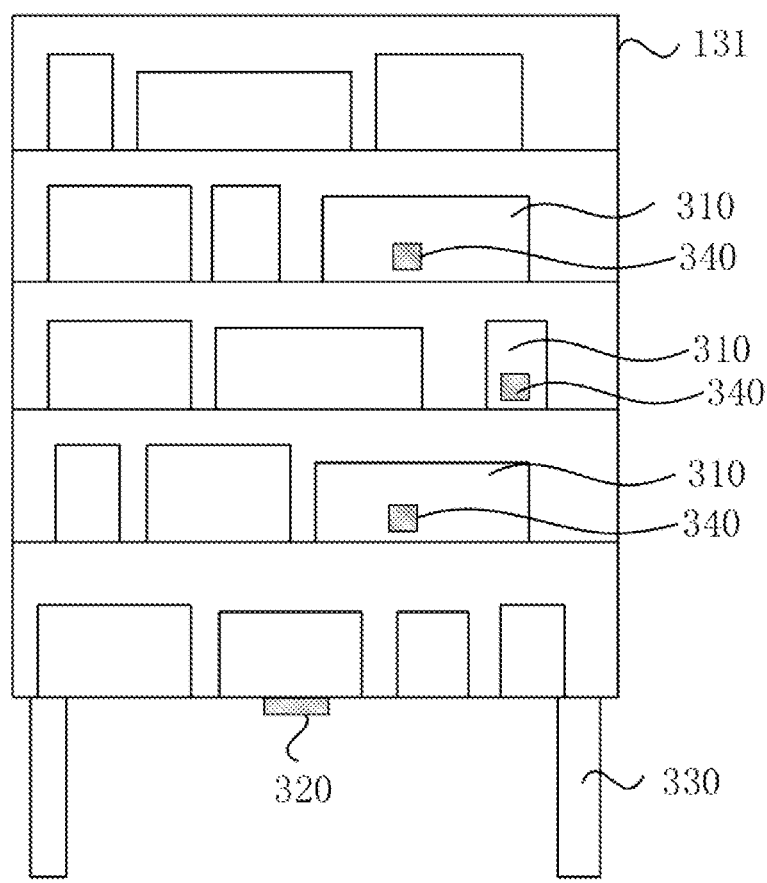
FIG. 3 is a schematic diagram of an inventory container provided by an embodiment.

FIG. 3 is a schematic diagram of an inventory container provided by an embodiment. Referring to FIG. 3, the inventory container 131 may receive the storage container 310, and the storage container 310 may store items. In an embodiment, the inventory container 131 may be a high inventory container, and the inventory container 131 includes multiple vertically stacked interlayers, each interlayer being able to hold multiple storage containers 310. A first readable mark 340, such as a two-dimensional code, may be disposed near a front side of the storage container 310. After the access device 1102 travels to the front side of the temporary container 131, the first readable mark 340 configured on the storage container 310 is captured by a camera to ensure that the access device 1102 accurately grasps the storage container 310. The inventory container 131 may further include at least one supporter 330. In one embodiment, the storage container 310 may also be hung on a hook or pole within the inventory container 131 or on the inventory container 131. The storage container 310 may be placed within the inventory container 131 or on an external surface of the inventory container 131 in any suitable manner.

In an embodiment, the structure of the temporary container is the same as that of the inventory container 131. For example, the size of the temporary container may be the same as that of the inventory container 131, or may of course be smaller than the inventory container 131. The structure of the temporary container may refer to that of the inventory container 131. The temporary container may be placed next to an inventory container group and should not block a movement channel for the robot (e.g. access device 1101). In an embodiment, referring to the inventory container shown in FIG. 3, a bottom of the temporary container may be provided with a second readable mark 320 as shown in FIG. 3, such as the two-dimensional code. When the robot travels to underneath of the temporary container, the second readable mark 320 is captured by the upward camera to ensure that the robot is located directly below the temporary container, thereby ensuring that the robot may smoothly lift and carry the temporary container. The control system 120 is a software system running on a server and having capabilities of data storage and information processing, and may be connected to the access device, the carrying device, a hardware input system and other software systems in a wireless or wired mode. The control system 120 may include at least one server, and may be a centralized control architecture or a distributed computing architecture. The server may have a processor 121 and a memory 122 which may include an order pool 123 therein.

Taking the picking scenario in the warehousing management system shown in FIG. 1 as an example, in the traditional "goods-to-person" system, the entire inventory container 131 needs to be carried to the corresponding picking place when items of the order are picked each time, causing some unneeded items on the inventory container 131 to be carried to the corresponding picking place at the same time. Moreover the robot 110 needs to carry the inventory container 131 in which the items of the order are located to the workstation 140 for picking in the case of picking the needed items of the order. And thus in the process of picking the entire inventory container 131, the picking efficiency will be inevitably reduced, and the carrying energy consumption and implementation cost will be inevitably increased due to carrying of the entire inventory container 131.

The warehousing management system and method provided by the present disclosure are explained below by multiple embodiments.

Embodiment One

Figure 4:
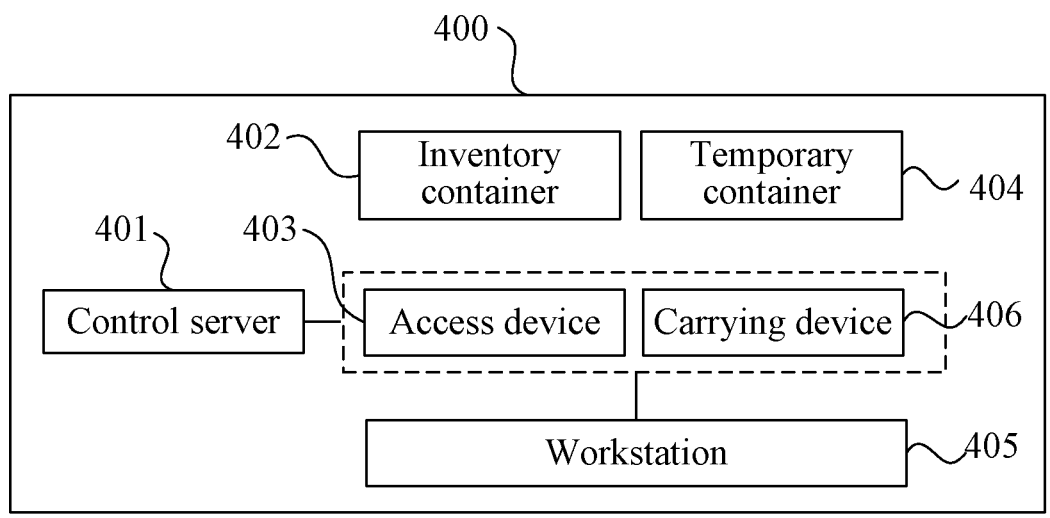
FIG. 4 is a block diagram of a warehousing management system provided by an embodiment.

FIG. 4 is a block diagram of a warehousing management system provided by an embodiment.

Figure 6:
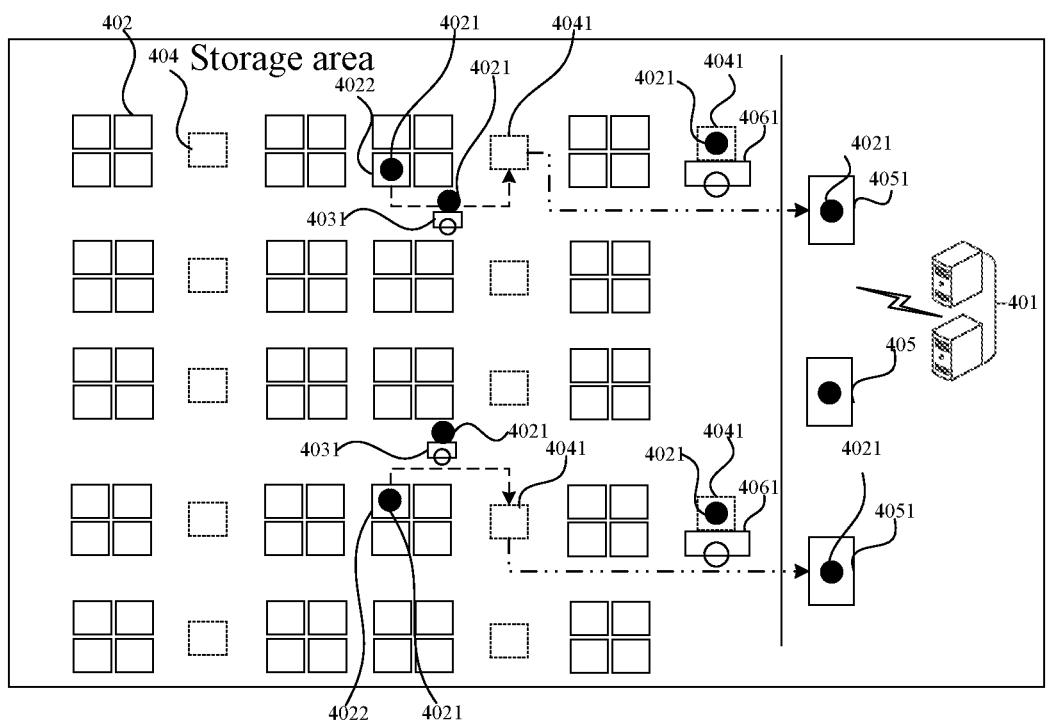
FIG. 6 is a schematic diagram of operation of a warehousing management system provided by an embodiment.

FIG. 6 is a schematic diagram of operation of a warehousing management system provided by an embodiment. The warehousing management system of this embodiment is applicable to a case of carrying items in the inventory container located in the inventory area, such as carrying the items in the inventory container located in the inventory area in picking, loading, stocking or other operation scenarios. The storage management system may implement the warehousing management method of any embodiment of the present disclosure. Referring to FIGS. 4 and 6, the warehousing management system 400 of this embodiment may include: a control server 401, an inventory container 402, an access device 403, a temporary container 404, a workstation 405, and a carrying device 406. The access device 403 and the carrying device 406 respectively communicate with the control server 401, and the inventory container 402 holds a storage container, and the inventory container 402 and the temporary container 404 are located in the storage area. In this embodiment, the control server 401 may be configured to, in response to a current task, determine a first target inventory container 4022 in which a target storage container requested by the current task is located, a first target access device 4031 configured to take out the target storage container from the first target inventory container 4022, a target temporary container 4041 configured to temporarily hold the target storage container and a target workstation 4051 configured to operate the target storage container; and send a first access instruction to the first target access container 4022. And when the target temporary container 4041 satisfies a preset condition, the control server 401 may be configured to determine a first target carrying device 4061 configured to carry the target temporary container 4041 to the target workstation 4051, and send a first carrying instruction to the first target carrying device 4061. The first target access device 4031 may be configured to, in response to the first access instruction, take out the target storage container from the first target inventory container 4022, carry and store the target storage container to the target temporary container 4041. And the first target carrying device 4061 may be configured to carry the target temporary container 4041 to the target workstation 4051 for operation in response to the first carrying instruction.

In this embodiment, the warehousing management system 400 may be applied to a traditional warehousing environment or a high warehousing environment. The scenario in which the warehousing management system 400 is applied at least includes the inventory area. In an embodiment, the inventory area may be used for placing at least one inventory container 402 and at least one temporary container 404. For example, the inventory container 402 may be a normal rack or a high rack, and correspondingly, the temporary container 404 may also be the normal rack or the high rack. In an embodiment, on the inventory container 402 or the temporary container 404 may be placed at least one storage container. The inventory container 402 or the temporary container 404 may include multiple vertically stacked interlayers, and each interlayer of the inventory container 402 or the temporary container 404 may hold at least one storage container. For example, the storage container may be, for example, a bin, a carton, a pass box, or a customized container that may be configured to store the corresponding items. The storage container may be placed on the inventory container 402 or the temporary container 404, and at least one item may be stored in the storage container.

In an embodiment, one temporary container corresponds to at least one of an inventory container group; and/or multiple temporary containers correspond to one inventory container group.

In an embodiment, referring to FIG. 1, multiple inventory containers may be placed in the inventory area, and every few inventory containers of the multiple inventory containers may be arranged into a rectangular inventory container group. Inventory container groups may be arranged in array, and a gap between arrays is a movement channel for the access device or the carrying device. At least one inventory container group may share a temporary container, or each inventory container group may use multiple temporary containers. The number of temporary containers may depend on a frequency of the target storage container currently requested by the new order. The frequency of requesting the target storage container is higher, the target storage container will be taken out more frequently. Correspondingly, sufficient temporary containers are required to hold the taken-out target storage container. Therefore, a larger number of temporary containers need to be disposed at a corresponding location of the inventory container in which the target storage container is located.

In this embodiment, the temporary container 404 may be the same or different type as the inventory container 402. For example, the temporary container 404 may have the same or different size as the inventory container 402. In this embodiment, the structure of the temporary container 402 may refer to that of the inventory container 402. The temporary container 404 may be placed next to the inventory container group 402 and should not block the movement channel of the access device 403 and the carrying device 406.

In an embodiment, the inventory area in which the inventory container 402 or the temporary container 404 is located may be provided with an access device 403, which is configured to take out the storage container from the inventory container 402 or the temporary container 404, or to store the storage container in the inventory container 402 or the temporary container 404. Exemplarily, for the picking scenario, the access device 403 may take out the storage container storing items to be picked from the inventory container 402 or the temporary container 404; for a replenishment scenario, the access device 403 may take out the storage container storing items to be replenished from the inventory container 402 or the temporary container 404. The access device 403 may be an access robot. The access robot may communicate with the control server 401, and may perform an access operation of the storage container according to an instruction sent by the control server 401.

Figure 5:
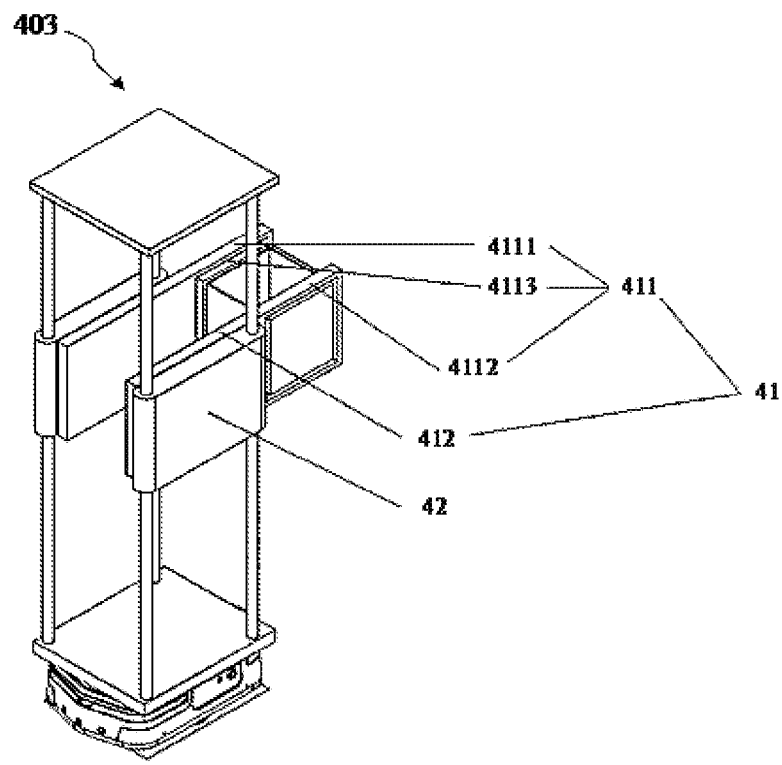
FIG. 5 is a schematic diagram of an access device provided by an embodiment.

In an embodiment, the access device 403 may have a grasping apparatus. Through adjusting a height of the grasping apparatus, the grasping apparatus grasps the storage container on the inventory container 402 or the temporary container 404, and the grasping apparatus places the storage container on the inventory container 402 or the temporary container 404. Exemplarily, FIG. 5 is a schematic diagram of an access device provided by the embodiment one. Referring to FIG. 5, the access device 403 may have a grasping apparatus. The grasping apparatus may include a telescopic component 41. The telescopic component 41 may be configured to grasp the storage container on the inventory container 402 or the temporary container 404. The grasping apparatus may further include a lifting component 42. The lifting component 42 may lift and/or lower the telescoping component 41 to a preset height, thus the access device 403 may adjust the height of the grasping apparatus such that the grasping apparatus grabs the storage container on any interlayer of the inventory container 402 or the temporary container 404, or the grasping apparatus places the storage container on any interlayer of the inventory container 402 or the temporary container 404. In an embodiment, the telescopic component 41 in the grasping apparatus may include a clamping portion 411 and a slide portion 412. The clamping portion 411 may grasp the storage container on the inventory container 402 or the temporary container 404 in a clamping mode, the clamping portion 411 is slidably connected to the slide portion 412, and the clamping portion 411 may slide toward a depth direction of a rack interlayer of the slide portion 412. The clamping portion 411 may include a first grasper 4111 and a second grasper 4112, which are oppositely disposed on left and right sides of the interlayer. The first grasper 4111 and the second grasper 4112 may be a plate-like structure as shown in FIG. 5, or may be another structure, such as a rod-like structure. The clamping portion 411 may further include a non-slip mat disposed inside each of the first grasper 4111 and the second grasper 4112. The non-slip mat 4113 may be foldable. When the clamping portion 411 does not grasp the temporary container, the non-slip mat 4113 is folded; and when the clamping portion 411 grasps the temporary container, the non-slip mat 4113 is opened. The height of the first grasper 4111 and the second grasper 4112 in a vertical direction matches the height of the interlayer of the rack, so that the first grasper 4111 and the second grasper 4112 may go deep into the interlayer of the inventory container 402 or the temporary container 404 to grasp the storage container on the interlayer.

In this embodiment, the inventory area in which the inventory container 402 or the temporary container 404 is located may also be provided with a carrying device 406 configured to carry the temporary container 404. The carrying device 406 may carry the temporary container 404 from the inventory area to the workstation 405. The carrying device 406 may be a robot. The robot may communicate with the control server 401, and may perform a carrying operation of the temporary container 404 according to an instruction sent by the control server 401.

The control server 401 may be configured to store, update, and manage a storage information base, and perform overall management according to a received request or instruction and an instruction issued by the storage information base to the device. Functions of the control server 401 will be described below by taking a picking scenario as an example; and of course the solution of this embodiment is not limited to the picking scenario, and may also be applied to scenarios of loading, replenishing, stocking or other operations. Referring to FIG. 6, an operation process of the control server 401 may include: after a new order is generated, the control server 401 may determine, in response to the current task corresponding to the new order and according to warehousing information, order information and a picking strategy associated with the new order, a first target inventory container 4022 in which a target storage container 4021 requested by the current task and corresponding to the new order is located, a first target access device 4031 configured to take out the target storage container 4021 from the first target inventory container 4022, a target temporary container 4041 configured to temporarily hold the target storage container 4021 and a target workstation 4051 configured to operate the target storage container 4021.

In an embodiment, referring to FIG. 6, since each new order may include at least one item that needs to be picked, for example, each new order may include multiple different types of items, and different types of items may be stored in different storage containers and placed on respective inventory containers. Therefore, when the items that need to be picked in the new order are grasped through the access device 403, the control server 401 may determine the storage container in which the items that need to be picked is located, i.e. determine the target storage container 4021; then the control server 401 determines the inventory container in which the target storage container 4021 in which the items that need to be picked is located, i.e., determine the first target inventory container in which the target storage container 4021 is located, so that the subsequent first target access device 4031 may accurately arrive at the corresponding first target inventory container 4022, and take out the corresponding target storage container 4021 from the first target inventory container 4022.

In an embodiment, referring to FIG. 6, the warehousing management system 400 may include multiple access devices. The access devices 403 may be distributed at different locations. In a case of using the first target access device 4031 to take out the target storage container 4021 from the first target inventory container 4022, it is necessary to use the access device 403 at the suitable location, so as to avoid problems of long access time and low work efficiency caused by scheduling a remote access device 403 to take out the target storage container 4021 from the first target inventory container 4022. In addition, the multiple access devices 403 may work in respective work areas of the inventory area. It is impossible to schedule an access device 403 in a cross-area manner to take out the target storage container 4021 from the first target inventory container 4022. Therefore, when it is required to select an access device 403 to take out the target storage container 4021 from the first target inventory container 4022, the access device 403 corresponding to the working area in which the first target inventory container 4022 is located is selected. Based on the above situation, the control server 401 may determine, in response to the current task corresponding to the new order, according to the warehousing information, the order information and the picking strategy associated with the new order, the first target access device 4031 configured to take out the target storage container 4021 from the first target inventory container 4022.

In this embodiment, referring to FIG. 6, at least one temporary container 404 is added to the warehousing management system 400. The temporary container 404 may temporarily hold the target storage container 4021 taken out from the first target inventory container 4022 by the first target access device 4031, thus the target temporary container 4041 holding the target storage container 4021 may be carried to the target workstation 4051 for a picking operation, thereby avoiding the problem that the first target inventory container 4022 in which the target storage container 4021 is located needs to be entirely carried to a corresponding work location for the picking operation when the items of the order are picked each time. However, since the warehousing management system 400 of this embodiment may include multiple inventory containers 402 and multiple temporary containers 404, and every one or more of the inventory containers 402 is provided with a corresponding dedicated temporary container 404, and not all of inventory containers 402 share a temporary container 404. Therefore, the control server 401 needs to determine a dedicated temporary container 404 corresponding to the first target inventory container 4022, i.e., the target temporary container 4041 temporarily holding the target storage container 4021. In addition, referring to FIG. 6, since the warehousing management system 400 may include multiple workstations 405, and the distances between the multiple workstations 405 and corresponding target temporary containers 4041 are different, so a suitable target workstation 4051 needs to be selected from the multiple workstations 405.

In an embodiment, the control server 401 may also assign a task corresponding to the new order to a determined target workstation 4051, so that a worker or an automatic device of the target workstation 4051 operates the target storage container 4021 in the target temporary container 4041 at the target workstation 4051, and picks the corresponding items according to the new order.

In this embodiment, referring to FIG. 6, after determining the first target inventory container 4022, the first target access device 4031, the target temporary container 4041 and the target workstation 4051, the control server 401 in the warehousing management system 400 may further send a first access instruction to the first target access device 402. In this embodiment, the first target access device 4031 may communicate with the control server 401. By communicating with the control server 401, the first target access device 4031 may receive the first access instruction sent by the control server 401. In response to the first access instruction sent by the control server 401, the first target access device 4031 may take out the target storage container 4021 from the first target inventory container 4022, carry and store to the target temporary container 4041. In an embodiment, when the control server 401 sends the first access instruction to the first target access device 402, the control server 401 may further plan a travel path for the first target access device 402. And then the first target access device 402 travels to the first target inventory container 4022 in which the target storage container 4021 is located according to the planned movement path, takes out the target storage container 4021 from the first target inventory container 4022, and carries the target storage container stores to the target temporary container 4041.

In this embodiment, when the target temporary container 4041 satisfies a preset condition, the control server 401 may also determine the first target carrying device 4061 configured to carry the target temporary container 4041 to the target workstation 4051. In an embodiment, the preset condition may be that the number of the storage containers in the target temporary container 4041 reaches a certain threshold, for example, the target temporary container 4041 is full of the storage containers, or the number of storage containers on the target temporary container 4041 reaches a fixed number. The first target carrying device 4061 may communicate with the control server 401. Communicatively connected to the control server 401, the first target carrying device 4061 may receive the first carrying instruction sent by the control server 401. The first target carrying device 4061 may carry the target temporary container 4041 to the target workstation 4051 for operation in response to the first carrying instruction sent by the control server 401, so as to select the target storage container 4021 from the target temporary container 4041 by the target workstation 4051 through the worker or the automatic device. In this embodiment, the target storage container 4021 may store the items that need to be picked by the current task corresponding to the new order. In an embodiment, in a case in which the control server 401 sends the first carrying instruction to the first target carrying device 4061, the control server 401 may further plan a travel path for the first target carrying device 4061 in advance, so that the first target carrying device 4061 travels to the target temporary container 4041 holding the target storage container 4021 according to the planned path, and carries the target temporary container 4041 to the target workstation 4051. In a mode of configuring the target temporary container 4041, the multiple taken-out target storage containers 4021 may be directly placed in one set. In this case, the target storage container 4021 on the target temporary container 4041 is the storage container in which the items that need to be picked are located. After the target temporary container 4041 is transported to a designated place (such as the workstation), the needed target storage container 4021 may be quickly picked in the target temporary container 4041, so as to greatly improve the efficiency of item picking.

In an embodiment, the access device 403 and the carrying device 406 may travel through two-dimensional code visual navigation, inertial navigation, simultaneous localization and mapping (SLAM) navigation, line-tracking navigation, or a combination thereof, such as the combination of the two-dimensional code visual navigation and the inertial navigation or the combination of the two-dimensional code visual navigation and the SLAM navigation.

In an embodiment, the target temporary container 4041 may be or may not be provided with a wheel. If the target temporary container 4041 is not provided with the wheel, the target temporary container 4041 may be located on the first target carrying device 4061, and the target temporary container 4041 may be carried to the target workstation 4051 for operation. In addition, in order to facilitate lifting the target temporary container 4041 by the first target carrying device 4061, a container marker may be disposed at the bottom of the target temporary container 4041, and the first target carrying device 4061 may identify the target temporary container 4041 according to the container marker. The target temporary container 4041 may be lifted by a lifting mechanism, and the target temporary container 4041 may be lifted and carried to the target workstation 4051 for operation. If the target temporary container 4041 is provided with the wheel, the first target carrying device 4061 may drag the target temporary container 4041 with the wheel, thereby carrying the target temporary container 4041 to the target workstation 4051 for operation.

Figure 7:
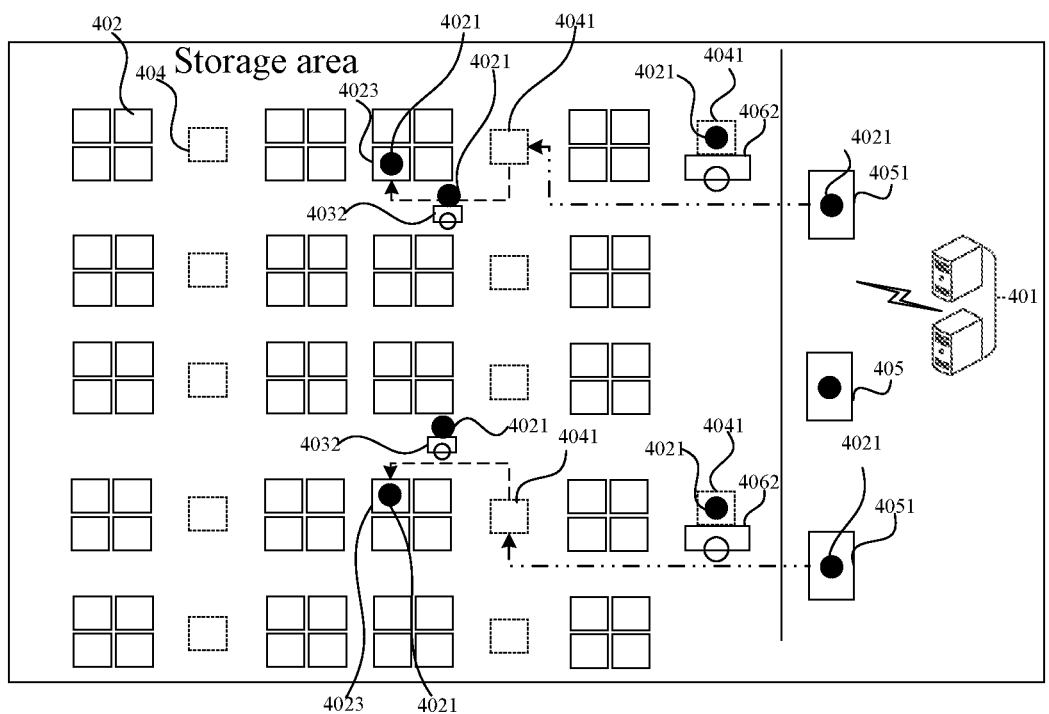
FIG. 7 is a schematic diagram of operation of another warehousing management system provided by an embodiment.

FIG. 7 is a schematic diagram of operation of another warehousing management system provided by an embodiment. Referring to FIG. 7, in this embodiment, after the target temporary container 4041 in which the target storage container 4021 is placed is carried to the target workstation 4051 for operation, the worker or robot in the target workstation 4051 may operate the target storage container 4021 in the target temporary container 4041, such as placing items to be stored into the target storage container 4021 or taking out items to be taken out from the target storage container 4021, thus the worker or the robot feeds a current task complete instruction back to the control server 401, and subsequently, the target temporary container 4041 located at the target workstation 4051 is removed again.

In an embodiment, referring to FIGS. 4 and 7, the control server 401 in the warehousing management system 400 may be further configured to, in response to the current task complete instruction, determine a second target carrying device 4062 configured to carry the target temporary container 4041, a second target access device 4032 configured to take out the target storage container 4021 from the target temporary container 4041 and a second target inventory container 4023 configured to operate the target storage container 4021, send a second carrying instruction to the second target carrying device 4062 and send a second access instruction to the second target access device 4032; the second target carrying device 4062 may be configured to, in response to the second carrying instruction, carry the target temporary container 4041 from the target workstation 4051 to the inventory area. The second target access device 4032 may be configured to, in response to the second access instruction, take out the target storage container 4021 from the target temporary container 4041, carry and store the target storage container 4021 to the second target inventory container 4023.

In this embodiment, referring to FIG. 7, an operation process of the control server 401 in the warehousing management system 400 may further include: after operating the target storage container 4021 in the target temporary container 4041, the worker or the robot in the target workstation 4051 feeds the current task complete instruction to the control server 401. The control server 401 determines, in response to the current task complete instruction, the second target carrying device 4062 configured to carry the target temporary container 4041, the second target access device 4032 configured to take out the target storage container 4041 from the target temporary container 4021, and the second target inventory container 4023 configured to store the target storage container 4021.

In the embodiment, the second target carrying device 4062 may communicate with the control server 401. Communicatively connected to the control server 401, the second target carrying device 4062 may receive the second carrying instruction sent by the control server 401. Referring to FIG. 7, after the control server 401 determines the second target carrying device 4062, the second target access device 4032 and the second target inventory container 4023, the control server 401 may send the second carrying instruction to the second target carrying device 4062. The second target carrying device 4062 may carry the target temporary container 4041 from the target workstation 4051 to the inventory area in response to the second carrying instruction sent by the control server 401. In an embodiment, in a case in which the control server 401 sends the second carrying instruction to the second target carrying device 4062, the control server 401 may further plan a travel path for the second target carrying device 4062 in advance, so that the second target carrying device 4062 carries the target temporary container 4041 from the target workstation 4051 to the inventory area according to the planned path.

In the embodiment, the second target access device 4032 may further communicate with the control server 401. Communicatively connected to the control server 401, the second target access device 4032 may receive the second access instruction sent by the control server 401. Referring to FIG. 7, the control server 401 may also send the second access instruction to the second target access device 4032. The second target access device 4032 may take out, in response to the second access instruction sent by the control server 401, the target storage container 4021 from the target temporary container 4041 located at the inventory area, carry and store to the second target inventory container 4023. In an embodiment, in a case in which the control server 401 sends the second access instruction to the second target access device 4032, the control server 401 may further plan the travel path for the second target access device 4032 in advance, so that the second target access device 4032 takes out the target storage container 4021 from the target temporary container 4041 located at the inventory area according to the planned path, carries and stores the second target inventory container 4023.

In an embodiment, referring to FIG. 6 and FIG. 7, the first target inventory container 4022 and the second target inventory container 4023 may be a same inventory container or different inventory containers.

In this embodiment, referring to FIG. 6, in a case where the control server 401 responds to the current task, the first target access device 4031 may, in response to the first access instruction sent by the control server 401, take out the target storage container 4021 from the first target inventory container 4022, carry and store the target storage container 4021 to the target temporary container 4041; the first target carrying device 4061 may, in response to the first carrying instruction send by the control server 401, carry the target temporary container 4041 to the target workstation 4051 for operation. Referring to FIG. 7, in a case in which the control server 401 responds to the current task complete instruction, the second target carrying device 4062 may further respond to the second carrying instruction, and carry the target temporary container 4041 from the target workstation 4051 to the inventory area. The second target carrying device 4032 may further, in response to the second access instruction, take out the target storage container 4021 from the target temporary container 4041, carry and store the target storage container to the second target inventory container 4023.

In the embodiment, after the first target carrying device 4061 carries the target temporary container 4041 to the target workstation 4051 in response to the first carrying instruction, the first target carrying device 4061 may put down the target temporary container 4041 to perform other tasks, and may carry the target temporary container 4041 until the target temporary container 4041 is operated, and the target temporary container 4041 is directly carried by the target workstation 4051 to the inventory area. Therefore, the first target carrying device 4061 and the second target carrying device 4062 may be same devices or different devices.

In this embodiment, the first target inventory container 4022 and the second target inventory container 4023 involved in the above scheduling process may be the same inventory container. When the first target inventory container 4022 and the second target inventory container 4023 are the same inventory container, it indicates that the control server 401 controls the second target carrying device 4062 and the second target access device 4032 replaces the target storage container 4021 onto the first target inventory container 4022, i.e., replacing the original inventory container. In addition, when the control server 401 controls the second target carrying device 4062 and the second target access device 4032 replaces the target storage container 4021 onto the first target inventory container 4022, the target storage container 4021 may be directly placed into the original location of the inventory container, the target storage container 4021 may also be placed into other locations in addition to the original location of the inventory container. In an embodiment, the first target inventory container 4022 and the second target inventory container 4023 involved in the above scheduling process may be different inventory containers, when the first target inventory container 4022 and the second target inventory container 4023 are different inventory containers, it indicates that the control server 401 controls the second target carrying device 4062 and the second target access device 4032 places the target storage container 4021 onto other inventory containers instead of the original inventory container.

In an embodiment, the first target carrying device is configured to, in response to the first carrying instruction, carry the target temporary container to the target workstation for operation in the following manners: carrying the target temporary container to a waiting area of the target workstation for queuing in response to the first carrying instruction. Correspondingly, the control server may be configured to, in response to an operation instruction, determine a third target carrying device configured to carry the target temporary container, and send a third carrying instruction to the third target carrying device; the third target carrying device is configured to carry the target temporary container from the waiting area of the target workstation to a working area of the target workstation for operation in response to the third carrying instruction.

In this embodiment, the first target carrying device may carry the target temporary container to the target workstation for operation in response to the first carrying instruction. Considering that multiple temporary containers may be provided at the target workstation, the multiple temporary containers located at the target workstation need queue for subsequent operations. In this case, if the first target carrying device keeps carrying the target temporary container without carrying other temporary containers, working efficiency of the first target carrying device is inevitably decreased. Based on the above situation, after the first target carrying device carries the target temporary container to the target workstation, the target temporary container may be placed in a specific area, for example, the target workstation is divided into a working area and a waiting area, and this specific area may be a waiting area. In this case, the first target carrying device may perform other carrying tasks. In an embodiment, the first target carrying device is configured to carry the target temporary container to the waiting area of the target workstation for queuing in response to the first carrying instruction.

In this embodiment, when the target temporary container needs to be operated at the target workstation, for example, when the target storage container needs to be selected on the target temporary container located at the waiting area of the target workstation, the control server may also determine, in response to an operation instruction, the third target carrying device configured to carry the target temporary container, and send the third carrying instruction to the third target carrying device. The third target carrying device may communicate with the control server and receive the third carrying instruction sent by the control server. The third target carrying device may carry the target temporary container from the waiting area of the target workstation to the working area of the target workstation for operation in response to the third carrying instruction. In this embodiment, the target workstation may include the waiting area of the target workstation and the working area of the target workstation.

In an embodiment, the third target carrying device may have a same action area with the first target carrying device; or the action area of the third target carrying device may be located at an area in which the target workstation is located. In an embodiment, the third target carrying device has the same function as the first target carrying device, and the third target carrying device has the same movement range as the first target carrying device; or functions of the third target carrying device and the first target carrying device may not be exactly the same, the third target carrying device may only be responsible for the area in which the target workstation is located. For example, the third target carrying device may only be responsible for carrying the target temporary container from the waiting area of the target workstation to the working area, and the movement range of the third target carrying device is also limited to an area in which the target workstation is located.

In an embodiment, the storage container may be provided with a marker, and the access device may be provided with an identification apparatus. The identification apparatus is configured to determine a storage container that needs to be taken out on the inventory container or the temporary container by identifying the marker.

In this embodiment, the storage container is an independent item storage unit. In order to facilitate knowing the location of the storage container by the access device, the storage container may be provided with a container marker. The container marker may be a two-dimensional code or other graphical markers similar to the two-dimensional code, or a RFID or other electronic tags having a wireless transmission capability similar to the RFID. The access device may be configured with the identification apparatus. The identification apparatus may identify the storage container that needs to be taken out on the inventory container or the temporary container by the container marker, thereby performing a corresponding grasping operation on the storage container that needs to be taken out on the inventory container or the temporary container.

In an embodiment, the control server may also be configured to determine a fourth target carrying device configured to carry an idle temporary container, and after the first target carrying device carries the target temporary container, send a fourth carrying instruction to the fourth target carrying device; the fourth carrying instruction may be configured to, in response to the fourth carrying instruction, carry the idle temporary container to an original location of the target temporary container to hold a subsequent taken-out storage container.

The solution of this embodiment is based on the control of the control server. Taking the temporary storage container as a transfer, the target storage container requested by the current task is carried by the target temporary container, thereby solving the problem that an entire inventory container needs to be carried to the corresponding workstation when the goods requested by the current task needs to be carried each time, thereby causing some unneeded goods to be carried to the corresponding workstation at the same time, thus increasing efficiency, reducing energy consumption and implementation cost.

Embodiment Two

Figure 8:
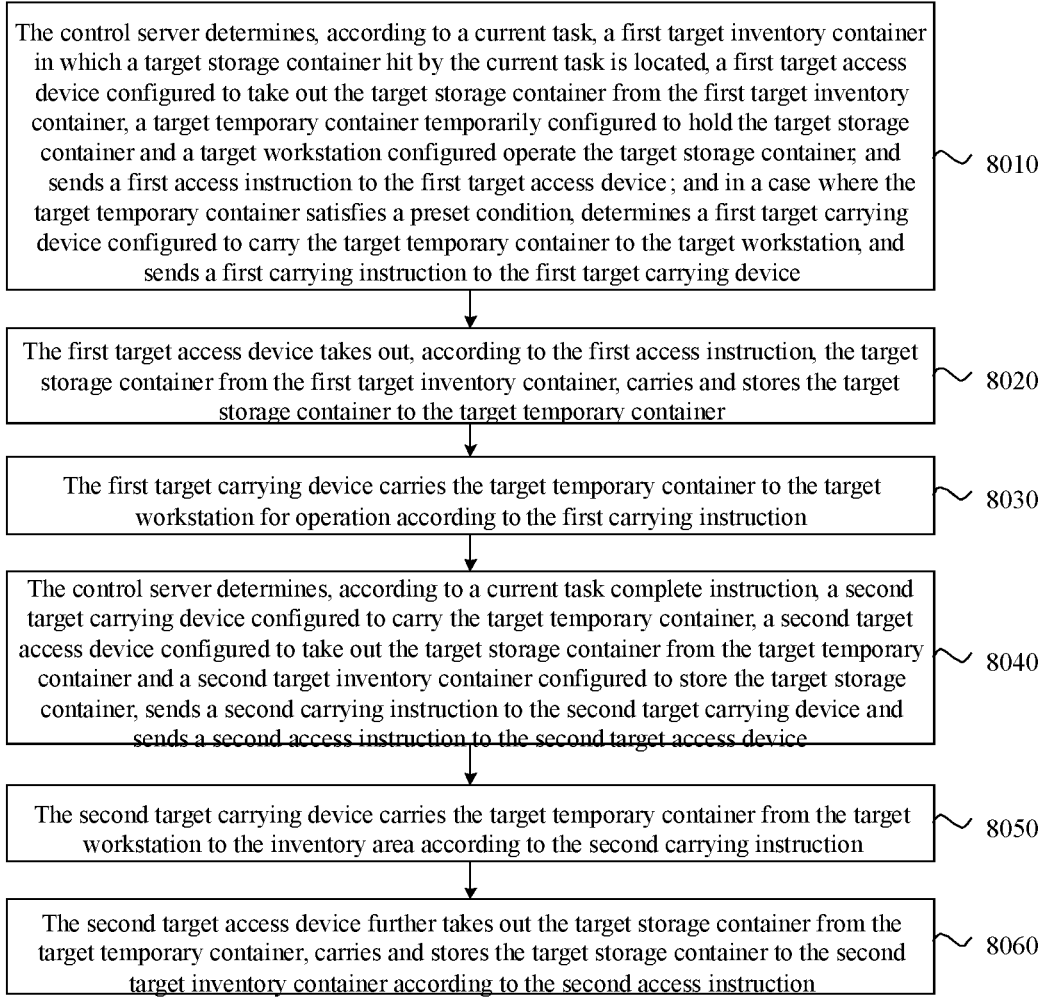
FIG. 8 is a flowchart of a warehousing management method provided by an embodiment.

FIG. 8 is a flowchart of a warehousing management method provided by an embodiment. This method may be executed by the warehousing management system of the above embodiment. The warehousing management method of this embodiment may be applied to a case of carrying items in an inventory container located in an inventory area, such as carrying the items in the inventory container located in the inventory area in picking, loading, stocking or other operation scenarios. Referring to FIG. 8, the warehousing management method of the embodiment may include the steps described below.

In step 8010, the control server determines, according to a current task, a first target inventory container in which a target storage container requested by the current task is located, a first target access device configured to take out the target storage container from the first target inventory container, a target temporary container configured to temporarily hold the target storage container and a target workstation configured to operate the target storage container, and send a first access instruction to the first target access container; and when the target temporary container satisfies a preset condition, determine a first target carrying device configured to carry the target temporary container to the target workstation, and send a first carrying instruction to the first target carrying device.

In step 8020, the first target access device takes out, according to the first access instruction, the target storage container from the first target inventory container, carries and stores the target storage container to the target temporary container.

In step 8030, the first target carrying device carries the target temporary container to the target workstation for operation according to the first carrying instruction.

In an embodiment, the warehousing management method may include the steps described below.

In step 8040, the control server determines, according to a current task complete instruction, a second target carrying device configured to carry the target temporary container, a second target access device configured to take out the target storage container from the target temporary container and a second target inventory container configured to store the target storage container, send a second carrying instruction to the second target carrying device and send a second access instruction to the second target access device.

In step 8050, the second target carrying device carries the target temporary container from the target workstation to the inventory area according to the second carrying instruction.

In step 8060, the second target access device takes out the target storage container from the target temporary container, carries and stores the target storage container to the second target inventory container according to the second access instruction.

In an embodiment, the first target inventory container and the second target inventory container are same or different.

In an embodiment, the step in which the first target carrying device carries the target temporary container to the target workstation for operation according to the first carrying instruction may include: the first target carrying device carries the target temporary container to a waiting area of the target workstation for queuing according to the first carrying instruction. Correspondingly, according to an operation instruction, the control server determines a third target carrying device configured to carry the target temporary container, and sends a third carrying instruction to the third target carrying device; the third target carrying device carries the target temporary container from the waiting area of the target workstation to a working area of the target workstation for operation according to the third carrying instruction.

In an embodiment, the third target carrying device has a same action area with the first target carrying device; or the action area of the third target carrying device is located within an area in which the target workstation is located.

In an embodiment, after the first target carrying device carries the target temporary container to the target workstation for operation according to the first carrying instruction, the method further includes: the control server determines a fourth target carrying device configured to carry an idle temporary container, after the first target carrying device carries the target temporary container, send a fourth carrying instruction to the fourth target carrying device; the fourth target carrying device carries an idle temporary container to an original location of the target temporary container to hold a subsequent taken-out storage container in response to the fourth carrying instruction.

In an embodiment, the first target carrying device and the second target carrying device are same devices or different devices.

In an embodiment, one temporary container corresponds to at least one inventory container group; and/or multiple temporary containers correspond to one inventory container group.

In an embodiment, the storage container is provided with a marker, and the access device is provided with an identification apparatus. The method further includes: the identification apparatus determines a storage container that needs to be taken out on the inventory container or the temporary container by identifying the marker.

Figure 9:
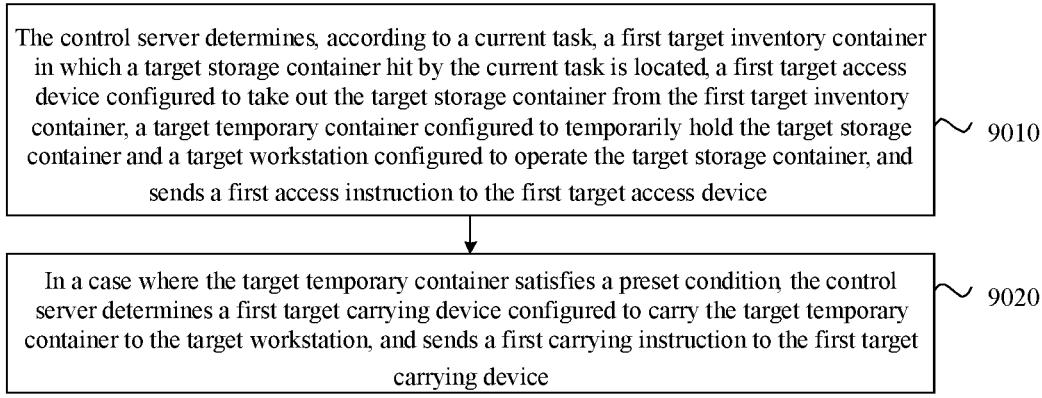
FIG. 9 is a flowchart of another warehousing management method provided by an embodiment.

FIG. 9 is a flowchart of another warehousing management method provided by an embodiment. The method may be executed by a control server. Referring to FIG. 9, the method provided by this embodiment includes the steps described below.

In step 9010, the control server determines, according to a current task, a first target inventory container in which a target storage container requested by the current task is located, a first target access device configured to take out the target storage container from the first target inventory container, a target temporary container configured to temporarily hold the target storage container and a target workstation configured to operate the target storage container, and send a first access instruction to the first target access container.

In this embodiment, the first access instruction is used for instructing the first target access device to take out the target storage container from the first target inventory container, carries and stores the target storage container to the target temporary container.

In step 9020, in a case where the target temporary container satisfies a preset condition, the control server determines a first target carrying device configured to carry the target temporary container to the target workstation, and send a first carrying instruction to the first target carrying device.

In this embodiment, the first carrying instruction is used for instructing the first target carrying device to carry the target temporary container to the target workstation for operation.

In an embodiment, the method further includes: the control server determines, according to a current task complete instruction, a second target carrying device configured to carry the target temporary container, a second target access device configured to take out the target storage container from the target temporary container and a second target inventory container configured to store the target storage container, send a second carrying instruction to the second target carrying device and send a second access instruction to the second target access device.

In an embodiment, the second carrying instruction is used for instructing the second target carrying device to carry the target temporary container from the target workstation to the inventory area; the second access instruction is used for instructing the second target access device to take out the target storage container from the target temporary container, carry and store the target storage container to the second target inventory container.

In an embodiment, the first target inventory container and the second target inventory container are same or different.

In an embodiment, the method further includes: the control server determines a third target carrying device configured to carry the target temporary container, sends a third carrying instruction to the third target carrying device. The third carrying instruction is used for instructing the third target carrying device to carry the target temporary container from a waiting area of the target workstation to a work area of the target workstation for operation.

In an embodiment, the method further includes: the control server determines a fourth target carrying device configured to carry an idle temporary container, after the first target carrying device carries the target temporary container, sends a fourth carrying instruction to the fourth target carrying device. The fourth carrying instruction is used for instructing the fourth target carrying device to carry the idle temporary container to an original location of the target temporary container to hold a subsequent taken-out storage container.

In an embodiment, the first target carrying device and the second target carrying device are same devices or different devices.

Figure 10:
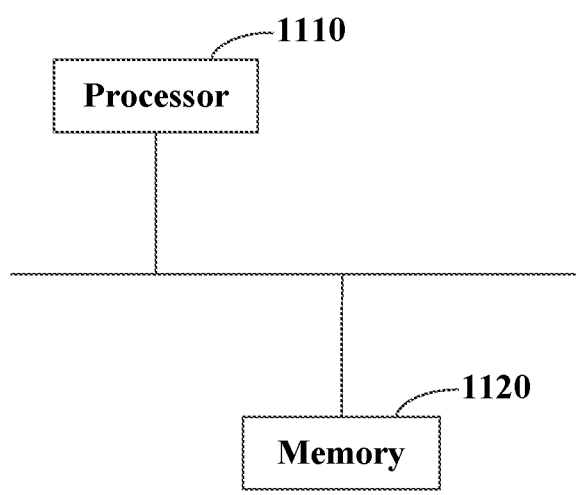
FIG. 10 is a block diagram of a control server provided by an embodiment.

FIG. 10 is a block diagram of a control server provided by an embodiment. Referring to FIG. 10, the control server provided by this embodiment includes at least one of processors 1110 and a memory 1120. FIG. 10 takes one processor 1110 as an example. The memory 1120 is configured to store at least one program. When executed by the at least one processor, the at least one program causes the at least one processor implements the warehousing management method of executed by the control server.

The solution of the present disclosure is based on the control of the control server. Taking the temporary storage container as a transfer, the target storage container requested by the current task is carried by the target temporary container, thereby solving a problem that an entire inventory container needs to be carried to the corresponding workstation when the goods requested by the current task needs to be carried each time, thereby causing some unneeded goods to be carried to the corresponding workstation at the same time, thus increasing efficiency, reducing energy consumption and implementation cost.

From the above description about the implementation mode, those skilled in the art can understand that the embodiments of the present disclosure may be implemented by means of software plus a necessary general-purpose hardware platform, or may of course be implemented by hardware. Based on this understanding, the technical solutions provided by the present disclosure may be embodied in the form of a software product. The software product may be stored in a computer readable storage medium, such as a computer floppy disk, a read-only memory (ROM), a random access memory (RAM), a flash, a hard disk or an optical disk, and includes multiple instructions for enabling a computer device (which may be a personal computer, a server or a network device) to execute the method according to any embodiment of the present disclosure.

In the embodiment of the system, the included multiple structures are just divided according to functional logic, and the division is not limited to this, as long as the corresponding functions can be realized. In addition, the specific names of the each functional structure are just intended for distinguishing, and are not to limit the protection scope of the embodiments of the present disclosure.

What is claimed is:

1. A warehousing management system, comprising: a control server, at least one inventory container, at least one access device, at least one temporary container, at least one workstation and at least one carrying device; wherein the at least one access device and the at least one carrying device respectively communicate with the control server, the at least one inventory container each contains a storage container, the at least one inventory container and the at least one temporary container are located in an inventory area;

the control server is configured to, in response to a current task, determine a first target inventory container of the at least one inventory container in which a target storage container requested by the current task is located, a first target access device of the at least one target access device which is configured to take out the target storage container from the first target inventory container, a target temporary container of the at least one temporary container which is configured to temporarily hold the target storage container, and a target workstation of the at least one workstation which is configured to operate the target storage container, and send a first access instruction to the first target access device; and when the target temporary container satisfies a preset condition, determine a first target carrying device of the at least one target carrying device which is configured to carry the target temporary container to the target workstation, and send a first carrying instruction to the first target carrying device;

the first target access device is configured to, in response to the first access instruction, take out the target storage container from the first target inventory container located in the inventory area, carry the target storage container and move on a ground of the inventory area to the target temporary container located in the inventory area to place the target storage container in the target temporary container; and the first target carrying device is configured to, in response to the first carrying instruction, carry the target temporary container located in the inventory area to the target workstation for operation;

wherein each access device comprises a telescopic component and a lifting component, the telescopic component of the first target access device is configured to grasp the target storage container and take the target storage container out from the first target inventory container, and the lifting component of the first target access device is configured to lift or lower the telescopic component to a height where the target storage container is capable of being grasped; and wherein the target workstation is determined according to the distances between the at least one workstation and the target temporary container.

2. The system of claim 1, wherein the control server is further configured to, in response to a current task complete instruction, select:

a second target carrying device configured to carry the target temporary container, a second target access device configured to take out the target storage container from the target temporary container, and a second target inventory container configured to store the target storage container, and the control server is further configured to:

send a second carrying instruction to the second target carrying device to carry the target temporary container from the target workstation to the inventory area, and send a second access instruction to the second target access device to take out the target storage container from the target temporary container, to carry the target storage container and to move to the second target inventory container to place the target storage container in the second target inventory container;

wherein the first target carrying device and the second target carrying device are same devices or different devices.

3. The system of claim 2, wherein the first target inventory container and the second target inventory container are same or different.

4. The system of claim 1, wherein the first target carrying device is configured to, in response to the first carrying instruction, carry the target temporary container to a waiting area of the target workstation for queuing;

the control server is further configured to, in response to an operation instruction, select a third target carrying device configured to carry the target temporary container, and send a third carrying instruction to the third target carrying device to carry the target temporary container from the waiting area of the target workstation to a working area of the target workstation for operation.

5. The system of claim 4, wherein the third target carrying device has a same action area with the first target carrying device; or the action area of the third target carrying device is located within an area in which the target workstation is located.

6. The system of claim 1, wherein the control server is further configured to select from the at least one carrying device, a fourth target carrying device configured to carry an idle temporary container; and after the first target carrying device carries the target temporary container, send a fourth carrying instruction to the fourth target carrying device to carry the idle temporary container to an original location of the target temporary container to hold a subsequent taken-out storage container.

7. The system of claim 1, wherein the at least one temporary container and the at least one inventory container are arranged in one of following manners:

one temporary container corresponds to at least one inventory container group; or a plurality of temporary containers corresponds to one inventory container group.

8. A warehousing management method, comprising:

determining, by the control server, according to a current task, a first target inventory container in which a target storage container requested by the current task is located, a first target access device configured to take out the target storage container from the first target inventory container, a target temporary container configured to temporarily hold the target storage container and a target workstation configured to operate the target storage container, and sending a first access instruction to the first target access device; and when the target temporary container satisfies a preset condition, determining a first target carrying device configured to carry the target temporary container to the target workstation, and sending a first carrying instruction to the first target carrying device;

taking out, by the first target access device, according to the first access instruction, the target storage container from the first target inventory container located in an inventory area, carrying the target storage container and moving on a ground of the inventory to the target temporary container located in the inventory area to place the target storage container in the target temporary container, wherein the first target access device comprises a telescopic component and a lifting component; and carrying, by the first target carrying device, according to the first carrying instruction, the target temporary container located in the inventory area to the target workstation for operation;

wherein the taking out, by the first target access device, according to the first access instruction, the target storage container from the first target inventory container located in an inventory area further comprises:

lifting or lowering, by the lifting component, the telescopic component to a height where the target storage container is capable of being grasped;

grasping, by the telescopic component, the target storage container and taking out from the first target inventory container;

wherein the target workstation is determined according to the distances between the at least one workstation and the target temporary container.

9. The method of claim 8, further comprising:

selecting, by the control server, according to a current task complete instruction, a second target carrying device configured to carry the target temporary container, a second target access device configured to take out the target storage container from the target temporary container and a second target inventory container configured to store the target storage container;

sending, by the control server, a second carrying instruction to the second target carrying device to carry the target temporary container from the target workstation to the inventory area; and sending, by the control server, a second access instruction to the second target access device to take out the target storage container from the target temporary container, to carry the target storage container and to move to the second target inventory container to place the target storage container in the second target inventory container;

wherein the first target carrying device and the second target carrying device are same devices or different devices.

10. The method of claim 9, wherein the first target inventory container and the second target inventory container are same or different.

11. The method of claim 8, wherein carrying, by the first target carrying device, according to the first carrying instruction, the target temporary container to the target workstation for operation comprises:

carrying, by the first target carrying device, according to the first carrying instruction, the target temporary container to a waiting area of the target workstation for queuing;

wherein the method further comprises:

selecting, by the control server, according to an operation instruction, a third target carrying device configured to carry the target temporary container, and sending a third carrying instruction to the third target carrying device to carry the idle temporary container to an original location of the target temporary container to hold a subsequent taken-out storage container;

wherein the third target carrying device has a same action area with the first target carrying device; or the action area of the third target carrying device is located within an area in which the target workstation is located.

12. The method of claim 8, further comprising:

selecting, by the control server, a fourth target carrying device configured to carry an idle temporary container; and after the first target carrying device carries the target temporary container, sending, by the control server, a fourth carrying instruction to the fourth target carrying device to carry the idle temporary container to an original location of the target temporary container to hold a subsequent taken-out storage container.

13. The method of claim 8, wherein the temporary container and the inventory container are arranged in one of following manners:

one temporary container corresponds to at least one inventory container group; or a plurality of temporary containers corresponds to one inventory container group.

14. A warehousing management method, comprising:

determining, by the control server, according to a current task, a first target inventory container in which a target storage container requested by the current task is located, a first target access device configured to take out the target storage container from the first target inventory container, a target temporary container configured to temporarily hold the target storage container and a target workstation configured to operate the target storage container, and sending a first access instruction to the first target access device; wherein the first access instruction is used for instructing the first target access device to take out the target storage container from the first target inventory container located in an inventory area, and carry the target storage container and move on a ground of the inventory area to the target temporary container located in the inventory area to place the target storage container in the target temporary container;

when the target temporary container satisfies a preset condition, selecting, by the control server, a first target carrying device configured to carry the target temporary container to the target workstation, and sending, by the control server, a first carrying instruction to the first target carrying device; wherein the first carrying instruction is used for instructing the first target carrying device to carry the target temporary container to the target workstation for operations;

wherein the first target access device comprises a telescopic component and a lifting component, the telescopic component is configured to grasp the target storage container and take the target storage container out from the first target inventory container, and the lifting component is configured to lift or lower the telescopic component to a height where the target storage container is capable of being grasped; and wherein the target workstation is determined according to the distances between the at least one workstation and the target temporary container.

15. The method of claim 14, further comprising:

selecting, by the control server, in response to a current task complete instruction, a second target carrying device configured to carry the target temporary container, a second target access device configured to take out the target storage container from the target temporary container and a second target inventory container configured to store the target storage container, sending, by the control server, a second carrying instruction to the second target carrying device, and sending, by the control server, a second access instruction to the second target access device;

wherein the second carrying instruction is used for instructing the second target carrying device to carry the target temporary container from the target workstation to the inventory area; the second access instruction is used for instructing the second target access device to take out the target storage container from the target temporary container, carry the target storage container and move to the second target temporary container to place the target storage container in the second target inventory container;

wherein the first target carrying device and the second target carrying device are same devices or different devices.

16. The method of claim 15, wherein the first target inventory container and the second target inventory container are same or different.

17. The method of claim 14, further comprising:

selecting, by the control server, a third target carrying device configured to carry the target temporary container, and sending, by the control server, a third carrying instruction to the third target carrying device; wherein the third carrying instruction is used for instructing the third target carrying device to carry the target temporary container from a waiting area of the target workstation to a working area of the target workstation for operation; or selecting, by the control server, a fourth target carrying device configured to carry an idle temporary container; after the first target carrying device carries the target temporary container, sending, by the control server, a fourth carrying instruction to the fourth target carrying device; wherein the fourth carrying instruction is used for instructing the fourth target carrying device to carry the idle temporary container to an original location of the target temporary container to hold a subsequent taken-out storage container.

18. The method of claim 14, further comprising:

selecting, by the control server, a fourth target carrying device configured to carry an idle temporary container; after the first target carrying device carries the target temporary container, sending, by the control server, a fourth carrying instruction to the fourth target carrying device; wherein the fourth carrying instruction is used for instructing the fourth target carrying device to carry the idle temporary container to an original location of the target temporary container to hold a subsequent taken-out storage container.

* * * * *